US010221972B2

(12) United States Patent
Guzzoni

(10) Patent No.: US 10,221,972 B2
(45) Date of Patent: Mar. 5, 2019

(54) CONNECTION SYSTEM OF PIPING

(71) Applicant: TESEO S.r.l., Desenzano del Garda (IT)

(72) Inventor: Paolo Guzzoni, Desenzano del Garda (IT)

(73) Assignee: TESEO S.R.L. (IT)

(*) Notice: Subject to any disclaimer, the term of this patent is extended or adjusted under 35 U.S.C. 154(b) by 431 days.

(21) Appl. No.: 14/905,949

(22) PCT Filed: Jul. 11, 2014

(86) PCT No.: PCT/IB2014/063035
§ 371 (c)(1),
(2) Date: Jan. 18, 2016

(87) PCT Pub. No.: WO2015/008203
PCT Pub. Date: Jan. 22, 2015

(65) Prior Publication Data
US 2016/0161033 A1    Jun. 9, 2016

(30) Foreign Application Priority Data
Jul. 19, 2013  (IT) .............................. BS2013A0107

(51) Int. Cl.
F16L 25/00    (2006.01)
F16L 21/08    (2006.01)

(52) U.S. Cl.
CPC .......... F16L 21/08 (2013.01); F16L 25/0009 (2013.01)

(58) Field of Classification Search
CPC . F16L 9/003; F16L 9/006; F16L 21/06; F16L 25/0009; F16L 25/10

USPC .................... 285/30, 370, 420, 18
See application file for complete search history.

(56) References Cited

U.S. PATENT DOCUMENTS

| 5,938,245 A * | 8/1999 | Guzzoni ................. F16L 21/08 285/305 |
| 6,179,349 B1 * | 1/2001 | Guzzoni ................... F16L 3/13 285/125.1 |
| 7,014,213 B1 * | 3/2006 | Kaiser ..................... F16L 9/003 285/125.1 |
| 7,731,247 B2 * | 6/2010 | Guzzoni ................. F16L 25/08 285/124.5 |

(Continued)

FOREIGN PATENT DOCUMENTS

FR    2663400 A3    12/1991

OTHER PUBLICATIONS

International Search Report dated Jul. 11, 2014 in corresponding PCT application PCT/IB2014/063035 filed Jul. 11, 2014.

Primary Examiner — Aaron M Dunwoody
(74) Attorney, Agent, or Firm — Waller Lansden Dortch & Davis, LLP; Matthew C Cox

(57) ABSTRACT

A connection system of piping for distribution systems of pressurized or depressurized fluids, the system including: —a connection joint having an insertion portion insertable in the piping so as to seal it and a retention portion, projecting therefrom when the joint is inserted therein; —a retainer suitable to longitudinally retain the connection joint to the piping, said retainer including: i) a retention element which engages the retention portion for constraining the joint longitudinally; and ii) clamping element adapted to exert a clamping force to lock the retention element to the piping.

10 Claims, 5 Drawing Sheets

(56) References Cited

U.S. PATENT DOCUMENTS

2005/0212293 A1* 9/2005 Matt ..................... F16L 21/08
285/414

* cited by examiner

CONNECTION SYSTEM OF PIPING

CROSS-REFERENCES TO RELATED APPLICATIONS

This application is a § 371 National Stage Application of International Patent Application No. PCT/IB2014/063035, filed Jul. 11, 2014, which claims priority from Italian Patent Application No. BS2013A000107, filed Jul. 19, 2013, the entire disclosures of which are incorporated herein by this reference.

BACKGROUND

The present invention relates to a connection system of piping, wherein said piping is a part of distribution systems of pressurised or depressurised fluids.

Specifically, the connection system of the present invention is suitable to connect a piping to a further piping, e.g. of the same diameter or different diameters, or to a valve, or components or machines that require pressurised or depressurised fluid to operate.

Moreover, such piping comprises at least a section of rigid bar or it totally consists of a rigid bar, and on its outer surface it comprises a plurality of grooves which extend along said bars.

Such connection systems have the need not to be subjected to the action of the pressurised or depressurised fluid which flows therein, for example by preventing them from being modified in shape and from extracting from the piping, and preventing any type of leaks. Therefore, said connection systems, in addition to sealingly engaging the respective piping, must be particularly resistant and finally retain their position in the piping in an integral manner.

Connection systems adapted to solve these types of problems are known in the prior art. Specifically, reference is made for example to document EP0919758 in the name of the Applicant.

However, the known connection systems have a number of drawbacks.

Often, such systems are particularly complex, comprising generally a joint element that has at least a portion of the same shape as the piping and also having appropriate means which apply clamping forces on the piping and on said portion of the joint to obtain the mutual blocking. In fact, the design and production of the joint, aimed to recreate at least in a portion the shape of the piping, as well as its blocking to said piping, are particularly complex and laborious.

The object of the present invention therefore is to meet the above needs by providing a connection system having a simpler structure and implementation.

This object is achieved by the connection system. Preferred embodiment variants involving further advantageous aspects are disclosed herein.

BRIEF DESCRIPTION OF THE DRAWINGS

The object of the present invention is described in detail hereafter, with the aid of the accompanying drawings.

DETAILED DESCRIPTION

Figure 1:
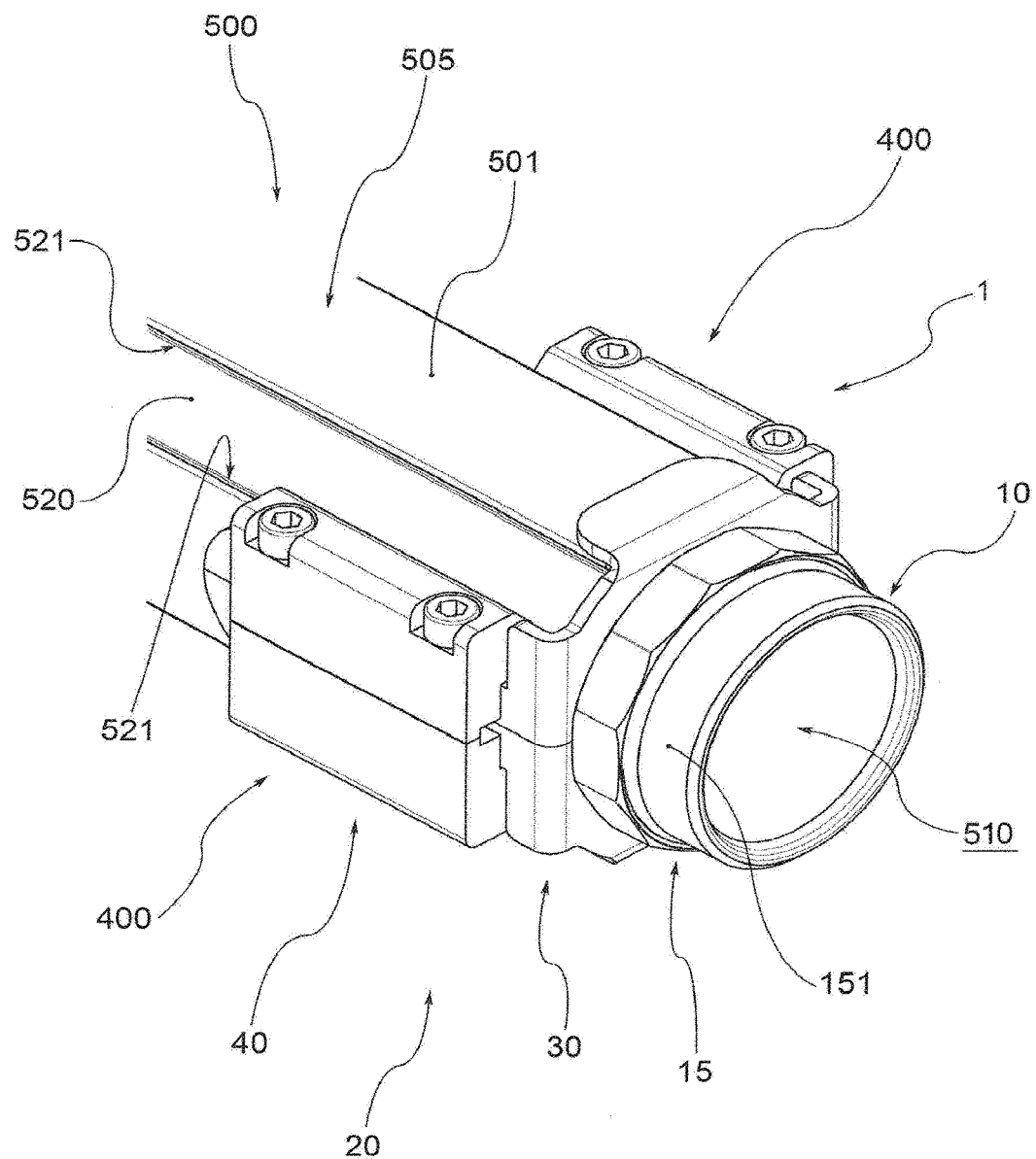
FIG. 1 is a perspective view of a connection system of piping, mounted on a section of rigid bar part of said piping, according to a preferred embodiment.
Figure 2:
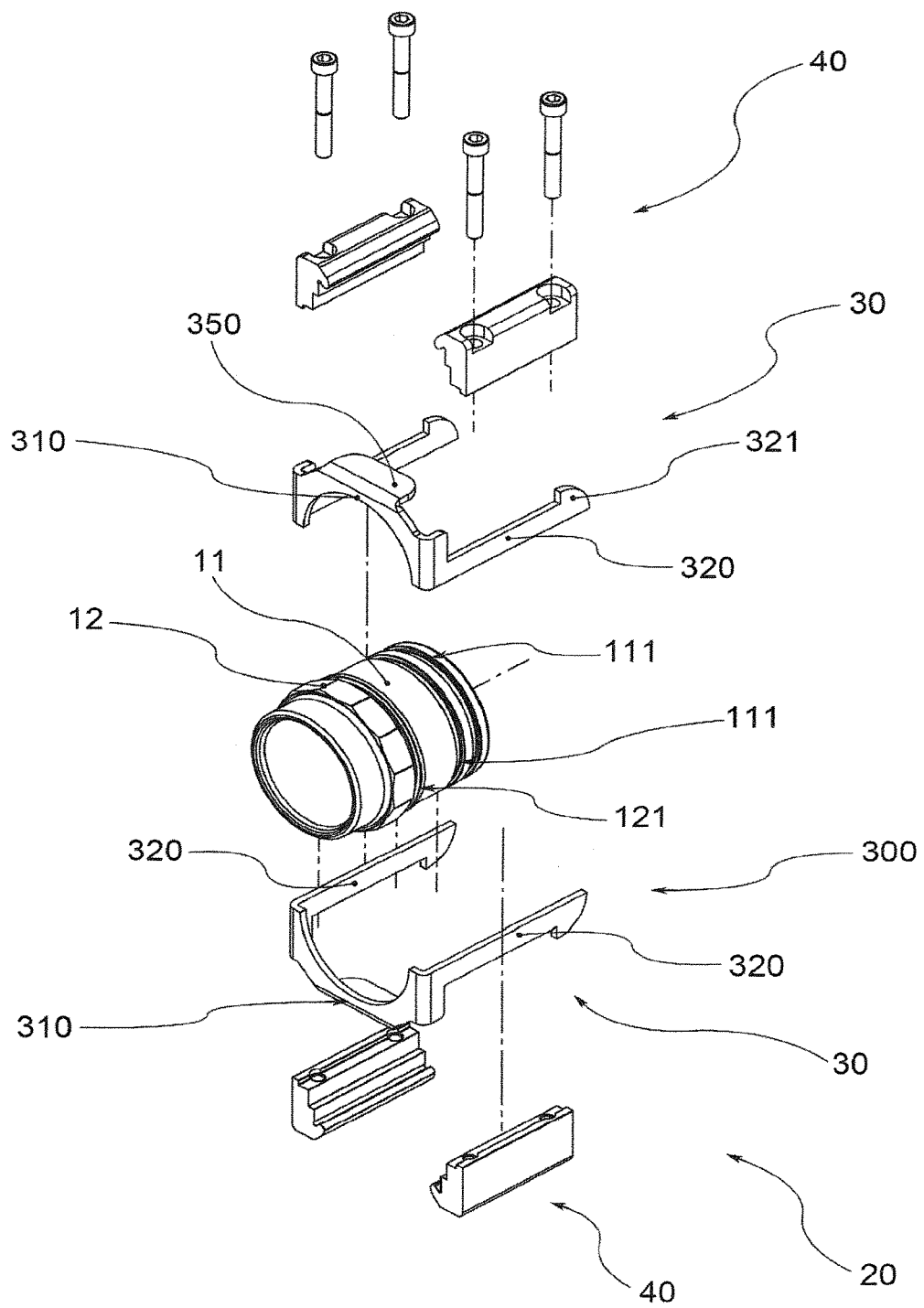
FIG. 2 is an exploded view of the connection system of piping in FIG. 1.
Figure 3:
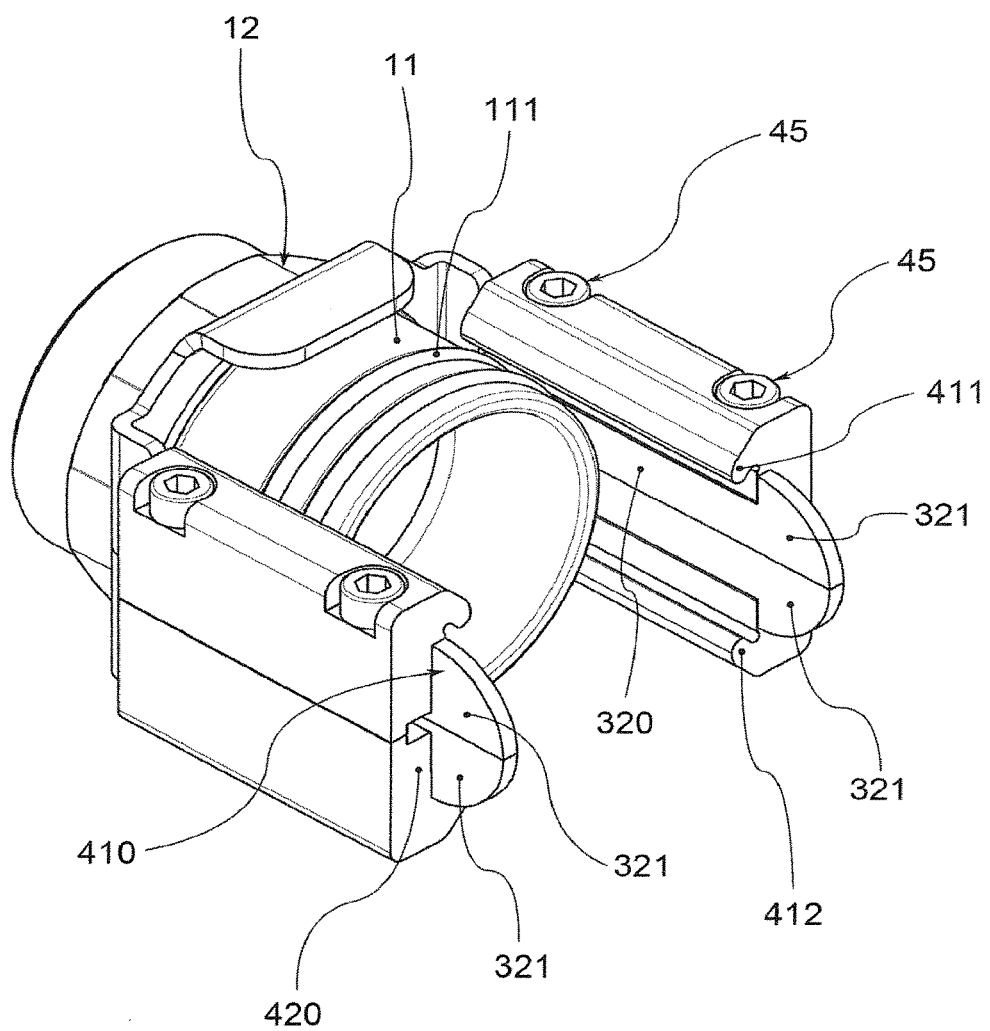
FIG. 3 is a perspective view of the connection system in FIGS. 1 and 2.
Figure 4:
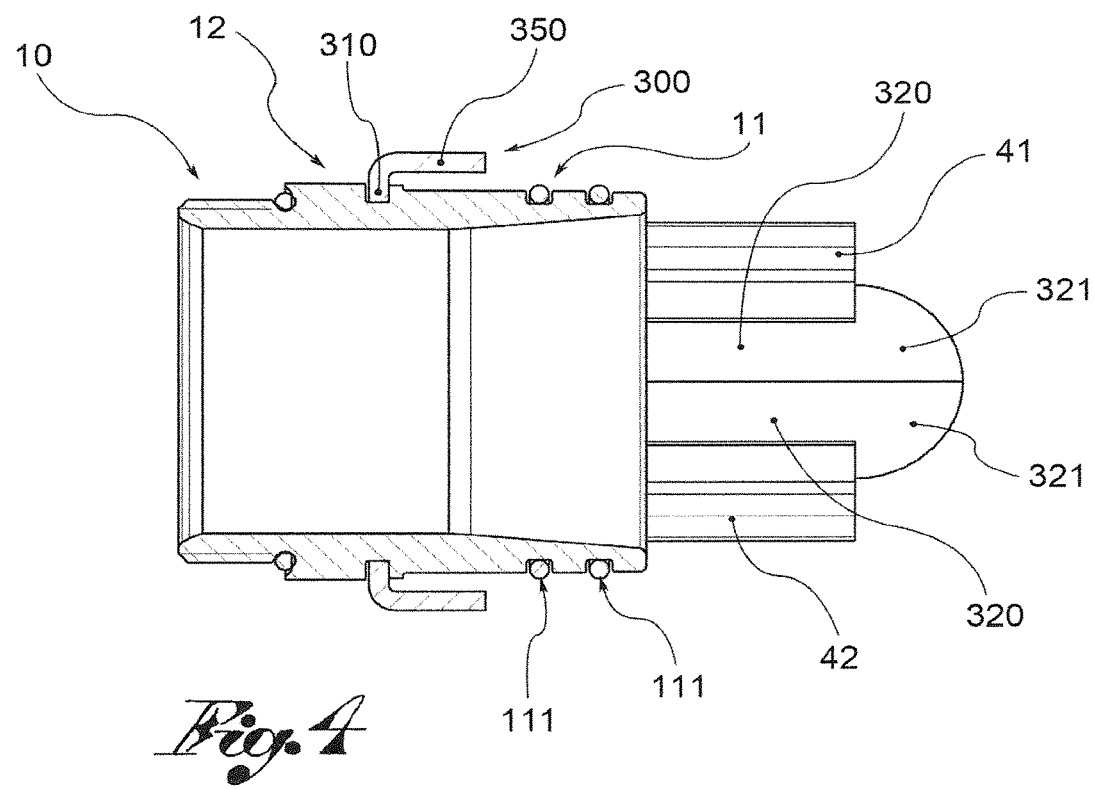
FIG. 4 is a longitudinal sectional view of the connection system in FIG. 1.
Figure 5:
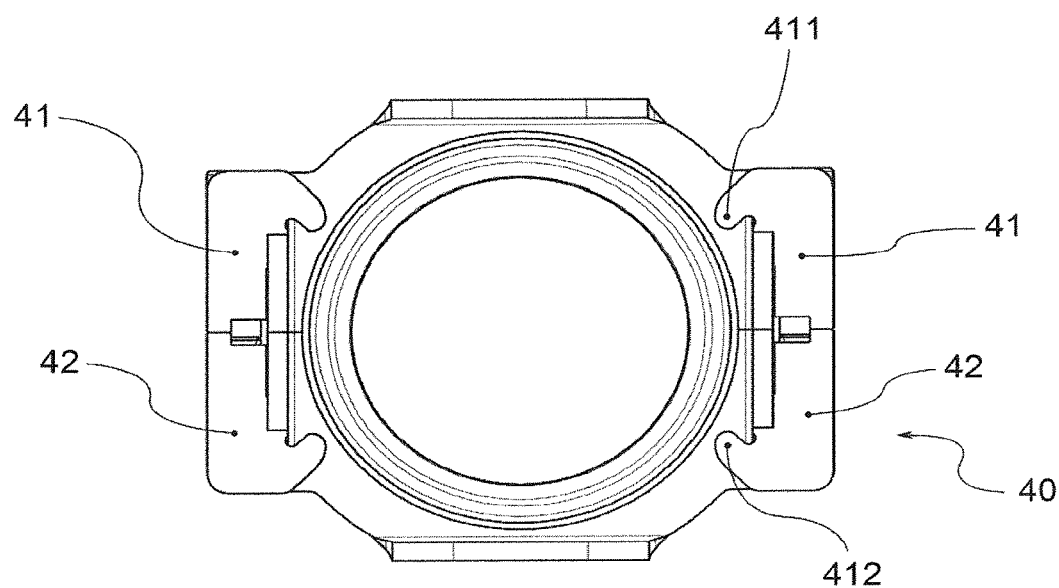
FIG. 5 is a back view of the connection system in FIG. 3.

With reference to the above drawings, reference numeral 1 indicates as a whole a connection system of piping 500 for distribution systems of pressurised or depressurised fluids.

Preferably, said piping 500 comprises at least a section of a rigid bar 501 which extends longitudinally and which, internally, has a hole 510 for the passage of the fluid. In further preferred embodiments, piping 500 in its entirety is formed by a rigid bar 501 which extends in a preferred direction of implementation, for example in a straight line, but also in a curvilinear manner.

Preferably, hole 510 for the passage of the fluid is circular; hole 510 is preferably centrally located to piping 500.

Preferably, the rigid bar 501 on its outer surface 505 includes a plurality of grooves 520, dovetailed, outwardly open. Preferably, said grooves extend along the whole extension of piping 500.

According to a preferred embodiment, wherein the rigid bar 501 has a quadrangular shape and, on the outer surface 505, at its corners, four grooves 520 are radially formed, bounded laterally by two edges 521.

Preferably, externally, said piping 500 is square and therefore has four equal sides.

In other embodiment variants, said piping 500 is rectangular and has essentially two square piping one above the other. Preferably, on the centre line of the two long sides, externally, said piping 500 in turn has grooves 520.

According to a preferred embodiment, the connection system 1 comprises a connection joint 10 comprising an insertion portion 11 insertable in hole 510 so as to seal it and a retention portion 12, projecting from piping 500 when joint 10 is inserted therein, adapted, as described further below, to engage appropriate components for the retention of joint 10 to, and in, piping 501.

According to a preferred embodiment, the insertion portion 11 comprises, for performing said sealed connection, one or more O-rings 111 located externally on the insertion portion 11 adapted to engage the inner surface of hole 510.

Preferably, the connection joint 10 is adapted to create a connection with piping 500 for the passage of compressed air with valves, further piping for example having the same diameter or different diameters and shapes; specifically, joint 10 comprises a hooking portion 15, after the retention portion 12, in turn positioned outside piping 500, adapted for the aforesaid purposes and to perform the above interactions.

In some embodiments, the hooking portion 15 has a threaded surface 151, for example internally or externally.

In further embodiments, for example for the connection of two identical piping 500, joint 10 does not have the hooking portion 15 but a further retention portion 12 and a further insertion portion 11 specific for the engagement with the second piping 500.

According to a preferred embodiment, the retention portion 12 outwardly has at least one retention slot 121.

Preferably, said retention slot 121 extends continuously peripherally to the connection joint 10.

Preferably, said retention slot 121 extends circularly about the connection joint 10.

Preferably, the connection system 1 further includes retention means 20 adapted to longitudinally retain the connection joint 10 to piping 500, in such a way that the force of the pressurised or depressurised fluid does not longitudinally move joint 10.

According to a preferred embodiment, the retention means 20 comprise:

i) a retention element 30 suitable to engage the retention portion 12 constraining the joint 10 longitudinally; and ii) clamping means 40 suitable to act in conjunction with a least one groove 520 and with the retention element 30, and suitable to exert a clamping force to block the retention element 30 to piping 500.

In other words, the retention element 30 is suitable to engage, inserting therein, said retention slot 121 present on the retention portion 12 and by the clamping means 40 said retention element 30 is kept fixed to piping 500 so to block joint 10.

According to a preferred embodiment, the clamping means 40 apply said clamping force on rims 521 of two consecutive grooves 520, in which the clamping means 40 comprise an upper clamp 41 and a lower clamp 42 respectively having a first tooth 411 and a second tooth 412 adapted to be placed inside the respective groove 520 engaging the respective rim 521.

Substantially, the clamping means 40 are therefore adapted to be clamped on piping 500 by operating on two consecutive grooves 520.

According to a preferred embodiment, the clamping means 40 comprise two pairs of clamps 400, each comprising an upper clamp 41 and a lower clamp 42 positioned at opposite sides of piping 500.

Preferably, the clamping means 40 comprise at least one clamping screw 45 suitable, following its rotation, to clamp the upper clamp 41 and the lower clamp 42 on the respective grooves 520 reciprocally drawing them together along the direction of extension of said screw 45. Preferably, the number of clamping screws 45 varies according to the length of the clamps. In other words, there are embodiments that provide a plurality of clamping screws 45 arranged spaced apart along the direction of extension of the respective pair of clamps 400, and thus of piping 500.

According to a preferred embodiment, the retention element 30 comprises at least one bracket 300 having a retention blade 310 suitable to engage the retention portion 12; preferably in the retention slot 121, and two clamping branches 320, which extend laterally to the sides of the retention blade 310, perpendicular thereto, suitable to engage with the clamping means 40 to block the retention element 30 and thus joint 10 to piping 500.

In other words, bracket 300 basically has a "U" or "C" shape, having the two branches 320 which extend along piping 500 on the opposite sides thereof, and the retention blade 310 that joins them.

Preferably, the retention blade 310 is shaped in accordance with the shape of the retention groove 121 in such a manner that blade 310 is housed in the latter with a geometrical coupling. Preferably in fact, blade 310 is adapted to house in the retention groove 121 so as to interact with the rims thereof, thus obtaining the longitudinal retention of the connection joint 10.

In a preferred embodiment, the retention slot 121 is circular and the retention blade 310 is arched.

According to a preferred embodiment, said upper clamp 41 and/or said lower clamp 42 have a channeling 410, 420 adapted to house the clamping branch 320. Preferably, therefore, the walls of channelling 410 and 420 are adapted, when the clamping means 40 are clamped on piping 500, to engage the clamping branch 320 or the respective clamping branch 320 and relieve the clamping forces thereon.

According to a preferred embodiment, moreover, the clamping branches 320 comprise at least one blocking portion 321, which extends from the respective clamping branch 320, and engaging with the clamping means 40 prevents the longitudinal translation of bracket 300.

In some embodiments, the clamping branch 320 includes a blocking portion 321, for example in the shape of a tooth, or a bulge, or a camber, or a tab, or a generic projection which engages the clamping means 40 so as to create a further obstacle to the longitudinal translation of bracket 300.

Preferably, the blocking portion 321 is placed at the end of the blocking branch 320 and protrudes, for example, longitudinally, from the respective clamp 41, 42 (as shown in the embodiments in FIGS. 1 to 5) or in general it protrudes from the clamping means 40.

According to further embodiments, instead, the blocking portion 321 is made at a predefined distance from the retention blade 300 and acts in conjunction with the respective clamp 41, 42 inside channelling 410, 420 which has a blocking cavity suitable to house said blocking portion 321. Preferably, said blocking cavity is formed on channelling 410, 420. In other words, in said embodiment the clamping branch 320, and in particular the clamping portion 321 does not protrude from the clamping means 40, but remains therein, once clamped.

Figure 6:
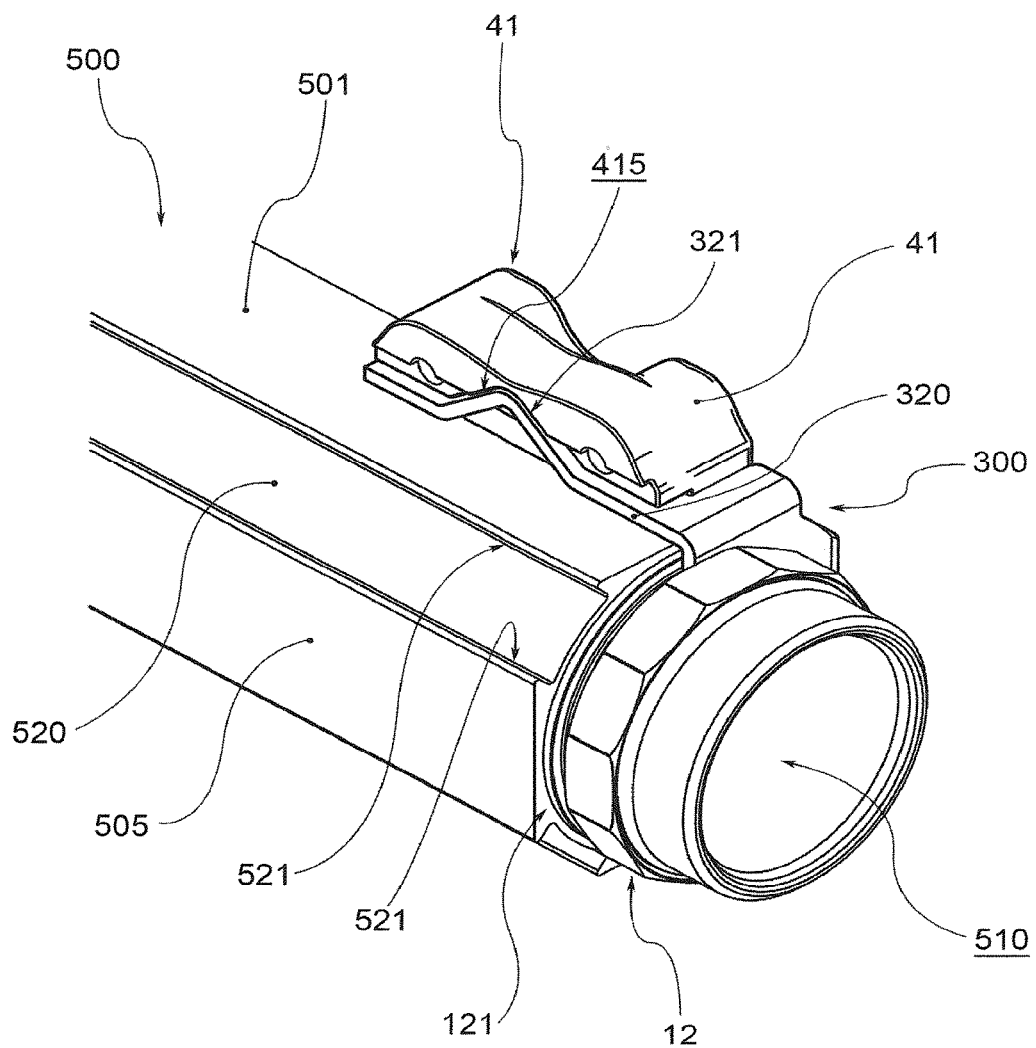
FIG. 6 is a perspective view of a part of a connection system of piping, mounted on a section of rigid bar part of said piping, according to a further embodiment.

In a further embodiment, the blocking portion 321 is formed at a predetermined distance from the retention blade 300, by means of a special shaping of the clamping branch 320 and cooperates with the respective clamp 41, 42 inside channelling 410, 420 which has a blocking housing 415 suitable for housing said blocking portion 321 (specifically, note the embodiment in FIG. 6). In particular in said embodiment, the clamping branch 320 has a specific shape while the blocking housing 415 is suitable for housing said shaped portion of branch 320 having complementary geometry.

In a preferred embodiment, furthermore, bracket 300, and in particular the retention blade 320 includes a strengthening portion 350 suitable for strengthening bracket 300 in such a manner that, when subjected to longitudinal forces, it is not bent or does not rotate.

In other words, said strengthening portion 350 extends perpendicularly by a certain distance from the retention blade 310, for example along the side surface 505 of piping 500. In some embodiments, therefore, as a result of the action of forces applied to bracket 300, the retention blade 310 remains in position thanks to the presence of the strengthening portion 350 which optionally rests on the outer surface 505 of piping 500.

According to a preferred embodiment, the retention element 30 comprises two brackets 300 positioned opposite each other and clamped on joint 10 by means of the clamping means 40. The two brackets 300, therefore, clamped by the clamping means 40, are adapted to clamp about the connection joint 10, for example by engaging it at 360°.

Embodiments of the connection system 1 are also provided wherein the retention element 30 is formed in one piece with the retention means 40.

In other words, the special retention elements 40 are made in a single piece with the upper clamp 41 and/or with the lower clamp 42, and are suitable to engage the connection joint 10, specifically engaging the retention portion 12, for example inserting into the respective retention slot 121.

In further embodiments, for example, the retention element 30 is made in one piece with the upper clamp 41 and/or with the lower clamp 42, respectively joining two opposite upper clamps 41 and/or two opposite lower clamps 42.

For example, two upper clamps 41, and similarly two lower clamps 42 are, in one piece, joined to each other by the retention element 30. In other words, two clamps at the opposite sides of a piping 500 are joined, for example by a portion similar to the retention blade 300.

Innovatively, the connection system object of the present invention is adapted to solve the prior art problems continuing to meet the needs of the application field.

Advantageously, in fact, the connection system object of the present invention has a simpler structure than those typical of the prior art.

Moreover, advantageously, the connection system comprises a connection joint having a simpler geometry than those typical of the prior art which, in fact, does not need to have at least a portion thereof which has the same shape as the piping with which it cooperates. Advantageously, the connection system of the present invention gains in simplicity of design and manufacture of the various components, with particular focus on the connection joint.

According to a further advantageous aspect, the longitudinal movement of the connection joint is obtained by a suitable retention element which cooperates with said joint, and only said retention element is fixed in a direct manner to the piping, distributing the relative forces involved on specific components.

According to a still further advantageous aspect, the retention means retain the same shape regardless of the embodiment of the connection joint which, for example, varies according to the type of connection to be performed, between two piping of different diameters or with a valve.

Advantageously, the components that need to perform the seal inside the piping, those that carry out the longitudinal retention and those that perform the clamping are separate from one another, and therefore, from a design viewpoint, each of said three components is designable and improved separately from the other according to specific needs.

A man skilled in the art may make several changes or replacements of elements with other functionally equivalent ones to the embodiments of the connection system object of the present invention in order to meet specific needs. Also such variants are included within the scope of protection as defined by the following claims.

Moreover, each variant described as belonging to a possible embodiment is implementable independently of the other variants described.

The invention claimed is:

1. Connection system of piping for distribution systems of pressurised or depressurised fluids, wherein said piping comprises at least a section of rigid bar, said piping is quadrangular in shape, said piping extends longitudinally and, has a hole internally for the passage of the fluid, and four dovetailed grooves are made radially and delimited laterally by two rims on an outer surface and at corners of the piping, the connection system comprising:
   a connection joint comprising an insertion portion insertable in the hole and a circular retention portion projecting from the piping when the joint is inserted therein, the retention portion outwardly having at least one retention slot;
   a retainer suitable to longitudinally retain the connection joint to the piping, said retainer comprising:
   a retention element suitable to engage the retention portion by insertion into the retention slot; and
   a clamping element suitable to act with the rims of two consecutive grooves and with the retention element, and suitable to exert a clamping force to block the retention element to the piping, wherein the clamping element includes an upper clamp and a lower clamp respectively having a first tooth and a second tooth suitable for being placed inside a respective groove engaging a respective rim,
   wherein at least one of the upper clamp and the lower clamp has a channelling,
   wherein the retention element includes at least one bracket having an arched retention blade suitable to engage the retention slot,
   wherein the retention element includes two clamping branches extending perpendicularly to the sides of the retention blade,
   wherein the two clamping branches are suitable to engage with the clamping element,
   wherein the clamping element houses the clamping branch and blocks the retention element and the joint to the piping, and
   wherein the clamping branches comprise at least one blocking portion extending from the respective clamping branch, engaging with the clamping element, and preventing the longitudinal translation of the bracket.

2. Connection system according to claim 1, wherein the upper clamp and the lower clamp positioned at opposite sides of the piping.

3. Connection system according to claim 1, wherein the clamping element comprises at least one clamping screw suitable, following rotation of the clamping screw, to clamp the upper clamp and the lower clamp on the respective grooves reciprocally drawing the upper clamp and the lower clamp together along the direction of extension of said clamping screw.

4. Connection system according to claim 1, wherein the retention slot extends continuously peripherally to the connection joint.

5. Connection system according to claim 1, wherein the blocking portion is at an end of the clamping branch and projects longitudinally from the respective clamp.

6. Connection system according to claim 1, wherein the blocking portion is spaced away from the retention blade and acts in conjunction with the respective clamp inside the channelling, the channelling having a blocking cavity suitable to house said blocking portion.

7. Connection system according to claim 1, wherein the blocking portion is spaced away from the retention blade by means of a shaping of the clamping branch and acts in conjunction with the respective clamp inside the channelling, the channelling having a blocking housing suitable to house said blocking portion.

8. Connection system according to claim 1, wherein the retention element comprises two brackets positioned opposite each other and clamped on the joint by means of the clamping element.

9. Connection system according to claim 1, wherein the retention element is made in one piece with at least one of the upper clamp and the lower clamp.

10. Connection system according to claim 1, wherein the retention element is made in one piece with at least one of the upper clamp and the lower clamp, respectively joining two opposite upper clamps.

* * * * *